United States Patent
Yang et al.

(10) Patent No.: US 9,841,885 B2
(45) Date of Patent: Dec. 12, 2017

(54) USER INTERFACE APPARATUS HAVING A WHEEL INPUT AND METHOD FOR CONTROLLING THE SAME

(71) Applicant: LG Electronics Inc., Seoul (KR)

(72) Inventors: Jeonghwa Yang, Seoul (KR); Youjin Lee, Seoul (KR); Wookjun Chung, Seoul (KR)

(73) Assignee: LG Electronics Inc., Seoul (KR)

(*) Notice: Subject to any disclaimer, the term of this patent is extended or adjusted under 35 U.S.C. 154(b) by 209 days.

(21) Appl. No.: 14/173,263

(22) Filed: Feb. 5, 2014

(65) Prior Publication Data

US 2014/0229896 A1    Aug. 14, 2014

(30) Foreign Application Priority Data

Feb. 8, 2013   (KR) ........................ 10-2013-0014403

(51) Int. Cl.
  *G06F 3/048* (2013.01)
  *G06F 3/0485* (2013.01)
  (Continued)

(52) U.S. Cl.
  CPC .......... *G06F 3/0485* (2013.01); *D06F 39/005* (2013.01); *G06F 1/1647* (2013.01);
  (Continued)

(58) Field of Classification Search
  CPC . G06F 17/30861; G06F 9/4443; B60K 37/06; B60K 2350/1004; G09G 5/14
  (Continued)

(56) References Cited

U.S. PATENT DOCUMENTS

2005/0195159 A1* 9/2005 Hunleth ................ G06F 3/0236
                                                        345/156
2006/0092129 A1   5/2006 Choquet et al.
(Continued)

FOREIGN PATENT DOCUMENTS

CN   101089804   12/2007
DE    10307756    9/2004
(Continued)

OTHER PUBLICATIONS

Extended European Search Report issued in European Application No. 14154075.7 dated May 2, 2016, 14 pages.
(Continued)

*Primary Examiner* — Joy M Weber
(74) *Attorney, Agent, or Firm* — Fish & Richardson P.C.

(57) ABSTRACT

A user interface apparatus includes a first display unit that is configured to display a plurality of first items, a wheel input unit that is positioned proximate a first side of the first display unit, a button input unit that is positioned within a circumference of the wheel input unit, and a second display unit that is positioned within the circumference of the wheel input unit. The wheel input unit is rotatable and is configured to, based upon being rotated, output a scroll command to scroll the plurality of first items. The button input unit is configured to, based upon being pressed, output a selection command to select a first item from the plurality of first items. The second display unit is configured to display the selected first item.

17 Claims, 9 Drawing Sheets

(51) Int. Cl.
  *G06F 3/0484* (2013.01)
  *G06F 3/0482* (2013.01)
  *G06F 3/0362* (2013.01)
  *D06F 39/00* (2006.01)
  *G06F 1/16* (2006.01)

(52) U.S. Cl.
  CPC .......... *G06F 3/0362* (2013.01); *G06F 3/0482* (2013.01); *G06F 3/04842* (2013.01); *G06F 3/04847* (2013.01)

(58) Field of Classification Search
  USPC .......................................... 715/832, 765, 810
  See application file for complete search history.

(56) References Cited

U.S. PATENT DOCUMENTS

| | | | | |
|---|---|---|---|---|
| 2006/0136246 | A1* | 6/2006 | Tu ..................... | G06F 17/30256 725/52 |
| 2007/0094417 | A1 | 4/2007 | Hur et al. | |
| 2007/0271528 | A1* | 11/2007 | Park ..................... | G06F 3/0482 715/810 |
| 2008/0059913 | A1* | 3/2008 | Burtner ................ | G06F 3/0482 715/854 |
| 2008/0204424 | A1* | 8/2008 | Jin ....................... | G06F 3/0482 345/173 |
| 2009/0019397 | A1* | 1/2009 | Buffet .................. | G06F 3/0482 715/837 |
| 2009/0198359 | A1* | 8/2009 | Chaudhri ............. | G06F 3/0482 700/94 |
| 2010/0017361 | A1* | 1/2010 | Pan ..................... | G06Q 30/0601 705/26.1 |
| 2010/0302018 | A1 | 12/2010 | Tuzar et al. | |
| 2012/0079430 | A1* | 3/2012 | Kwahk ................ | G06F 3/0488 715/834 |

FOREIGN PATENT DOCUMENTS

| | | |
|---|---|---|
| EP | 1868071 | 12/2007 |
| EP | 1873623 | 1/2008 |
| WO | 2012092445 | 7/2012 |

OTHER PUBLICATIONS

Office Action issued in Chinese Application No. 201410046101.2 dated Jul. 4, 2016, 25 pages (with English translation).
European Communication pursuant to Article 94(3) EPC in European Application No. 14154075.7, dated Apr. 19, 2017, 8 pages (with English translation).

\* cited by examiner

FIG. 3
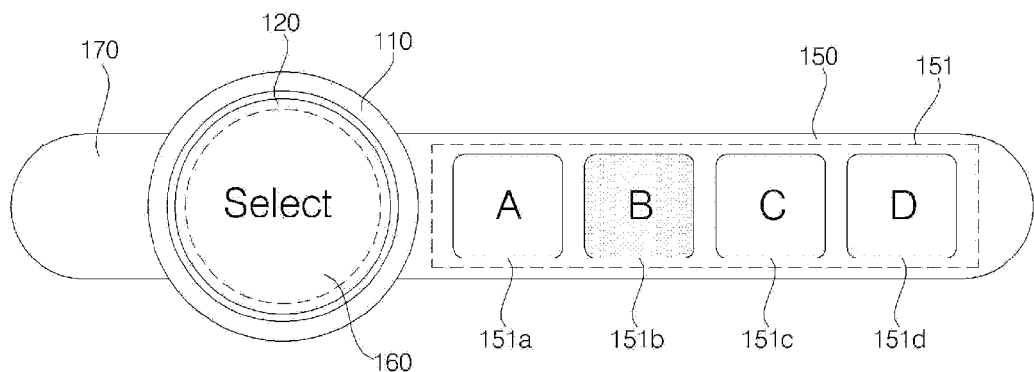
FIG. 4
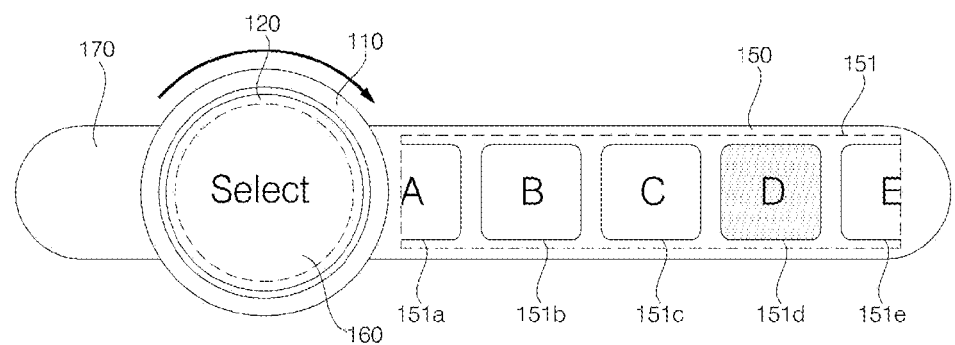
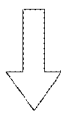
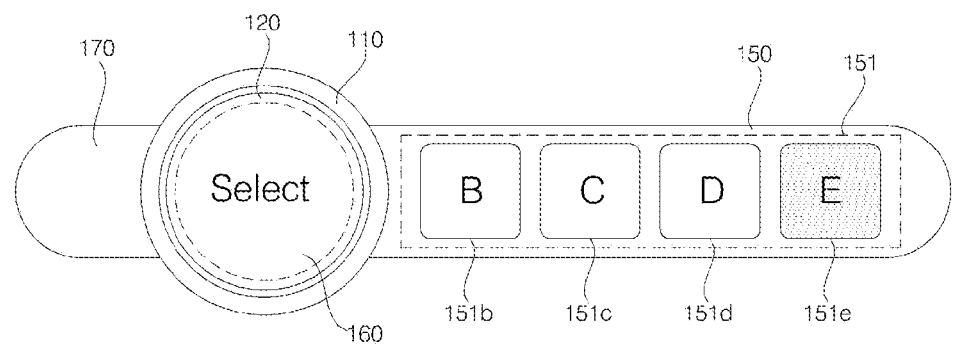

USER INTERFACE APPARATUS HAVING A WHEEL INPUT AND METHOD FOR CONTROLLING THE SAME

CROSS-REFERENCE TO RELATED APPLICATION

This application claims the priority benefit of the Korean Patent Application No. 10-2013-014403, filed on Feb. 8, 2013, in the Korean Intellectual Property Office, the disclosure of which is incorporated herein by reference.

TECHNICAL FIELD

The present application relates to a user interface apparatus and a method for controlling the same. More specifically, the present application relates to a user interface apparatus and a method for controlling the same, which allow intuitive and handy display and selection of a selectable item.

BACKGROUND

In general, the user interface apparatus is a device in a domestic appliance, a portable device, and so on for inputting an order thereto and displaying information on the order inputted thus thereon. It is required that the user interface apparatus used in the domestic appliance has limited areas of display means and input means, as well as displays a list of selectable items within the limited areas of the display means and input means, and allows the user to input the order in a convenient manner.

SUMMARY

Accordingly, an object of the present application can include providing a user interface apparatus and a method for controlling the same, which allows handy display of a list of selectable items as well as intuitive and handy selection of an item a user desires with simple input means.

Another object of the present application can include providing a user interface apparatus and a method for controlling the same, which allows displaying a list of a lower set of items together with a selected item within a limited area of display means, if a user selects a desired item.

According to one aspect, a user interface apparatus includes a first display unit configured to display a plurality of first items, a wheel input unit that is positioned proximate a first side of the first display unit, that is rotatable, and that is configured to, based upon being rotated, output a scroll command to scroll the plurality of first items, a button input unit that is positioned within a circumference of the wheel input unit and that is configured to, based upon being pressed, output a selection command to select a first item from the plurality of first items, and a second display unit that is positioned within the circumference of the wheel input unit and that is configured to display the selected first item.

Implementations of this aspect may include one or more of the following features. For example, the first display unit may be configured to, based on the selected first item being displayed on the second display unit, display a plurality of second items that are associated with the selected first item. The wheel input unit may be configured to, based upon the plurality of second items being displayed on the first display unit and the wheel input unit being rotated, output a scroll command to scroll the plurality of second items. The button input unit may be configured to, based upon the plurality of second items being displayed on the first display unit and the button input unit being pressed, output a selection command to select a second item from the plurality of second items. The second display unit may be configured to, based upon reception of the selection command to select the second item, display the selected second item, and the first display unit may be configured to, based upon reception of the selection command to select the second item, display a plurality of third items associated with the selected second item.

The user interface apparatus according to this aspect may include a third display unit that is positioned on a first side of the wheel input unit opposite a second side of the wheel input unit, wherein the second side of the wheel input unit is proximate the first side of the first display unit, the third display unit being configured to, based on the selected second item being displayed on the second display unit, display the first selected item. The wheel input unit may be configured to, based upon the plurality of third items being displayed on the first display unit and wheel input unit being rotated, output the scroll command to scroll the plurality of third items. The button input unit may be configured to, based upon the plurality of third items being displayed on the first display unit and the button input unit being pressed, output the selection command for selecting a third item from the plurality of third items. The first display unit may be configured to, based upon reception of the selection command to select the second item, display a plurality of third items associated with the selected second item, together with the plurality of second items that have not been selected. The wheel input unit may be configured to, based upon the plurality of third items being displayed on the first display unit and the wheel input unit being rotated, output the scroll command to scroll the plurality of third items. The button input unit may be configured to, based upon the plurality of third items being displayed on the first display unit and the button input unit being pressed, output the selection command to select a third item from the plurality of third items.

According to another aspect, a method for controlling a user interface includes displaying a plurality of first items on a first display unit, scrolling the plurality of first items based upon a wheel input unit that is provided on one side of the first display unit being rotated, selecting a first item from the plurality of first items based upon a button input unit that is provided within a circumference of the wheel input unit being pressed, and displaying the selected first item on a second display unit that is provided within the circumference of the wheel input unit.

Implementations of this aspect may include one or more of the following features. For example, the first display unit, based on the selected first item being displayed on the second display unit, may display a plurality of second items that are associated with the selected first item. The method may include, based upon the wheel input unit being rotated and the plurality of second items being displayed on the first display unit, scrolling the plurality of second items. The method may include, based upon the button input unit being pressed and the plurality of second items being displayed on the first display unit, selecting a second item from the plurality of second items. The method may include, based upon the second item being selected and the selected second item being displayed on the display unit, displaying a plurality of third items associated with the selected second item on the first display unit. The method may include, based upon the second item being selected, displaying on the first display unit a plurality of third items associated with the selected second item together with the plurality of second items that have not been selected.

According to yet another aspect, a user interface apparatus includes a first display unit configured to display a plurality of first items, a circular input unit that is provided proximate a first side of the first display unit and that is configured to, based upon user operation of the circular input unit, output a scroll command to scroll the plurality of first items or a selection command to select a first item from the plurality of first items, and a second display unit that is provided within a circumference of the circular input unit and configured to display the selected first item.

Implementations of this aspect may include one or more of the following features. For example, the circular input unit may be configured to, based upon being rotated, output the scroll command, and may be configured to, based upon being pressed, output the selection command. The circular input unit may be configured to, based upon being pressed at a left side, right side, upper side, or lower side thereof, output the scroll command, and the circular input unit may be configured to, based upon being pressed at a center region thereof, output the selection command.

The details of one or more implementations described in this specification are set forth in the accompanying drawings and the description below. Other potential features and aspects of the subject matter will become apparent from the description, the drawings, and the claims.

BRIEF DESCRIPTION OF THE DRAWINGS

FIGS. 3 to 6 are plan views each illustrating operation of the user interface apparatus.

Like reference symbols in the various drawings indicate like elements.

DETAILED DESCRIPTION

Figure 1:
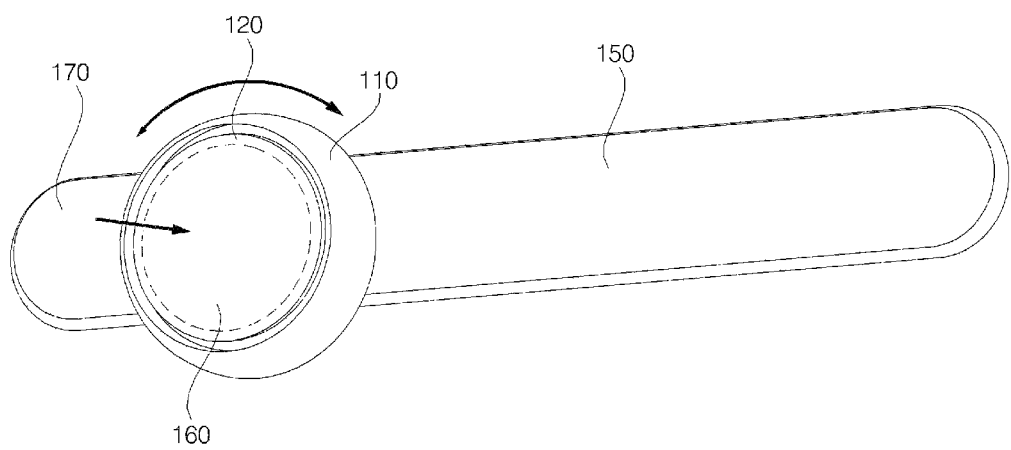
FIG. 1 is a perspective view of a user interface apparatus.
Figure 2:
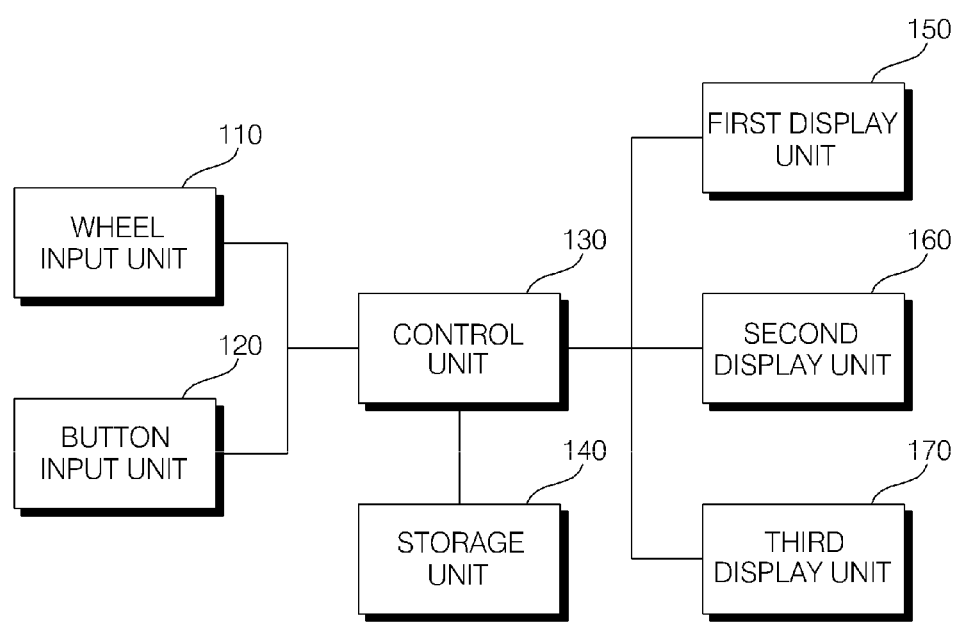
FIG. 2 is a block diagram illustrating the user interface apparatus of FIG. 1.

FIG. 1 is a perspective view illustrating a user interface apparatus in accordance with an implementation of the present application, and FIG. 2 is a block diagram illustrating the user interface apparatus in FIG. 1.

Referring to FIGS. 1 and 2, the user interface apparatus includes a first display unit 150 for displaying a plurality of selectable items, a wheel input unit 110 provided on one side of the first display unit 150 for outputting a scroll command, or order, to scroll a plurality of items displayed on the first display unit 150 when rotated, a button input unit 120 provided on an inside of the wheel input unit 110 for outputting a selection command, or order, to select an item of the plurality of the items when pressed, a second display unit 160 provided on an inner side of the wheel input unit 110 for displaying the selected item, a third display unit 170 provided on the other side of the one side of the wheel input unit 110 the first display unit 150 is provided thereto for displaying the selected item, a storage unit 140 for storing the plurality of selectable items and different pieces of information therein, and a control unit 130 for receiving the order from the wheel input unit 110 and the button input unit 120, having data loaded thereon from the storage unit 140, and producing frames to be displayed on the first display unit 150, the second display unit 160, and the third display unit 170, respectively.

The first display unit 150 is extended in a horizontal direction for displaying different pieces of information in the horizontal direction. The first display unit 150 can include LCD, LED, OLED, and the like.

In one implementation, the first display unit 150 displays a list of the plurality of selectable items in the horizontal direction. The first display unit 150 displays the plurality of selectable items in the horizontal direction. The items to be displayed on the first display unit 150 may be letters, or icons, or a combination of those. The control unit 130 retrieves the list on the plurality of selectable items from the storage unit 140 and displays the same on the first display unit 150.

When an item is selected from the plurality of selectable items, the first display unit 150 may display a plurality of a lower set of items of the selected item. The first display unit 150 may display other items or information together with the plurality of selectable items.

The wheel input unit 110 is provided on one side of the first display unit 150. In one implementation, the wheel input unit 110 is provided on a left side of the first display unit 150.

The wheel input unit 110 is a circular input unit for a user to input the order by rotating the same. The wheel input unit 110 can include a knob, wheel, and so on, and can further include a touch input device which does not rotate but can sense rotation.

If the wheel input unit 110 rotates in a clockwise direction, or an anti-clockwise direction, a scroll order outputs to the control unit 130. If the wheel input unit 110 outputs the scroll order thus, the control unit 130 scrolls the plurality of items displayed on the first display unit 150 in the horizontal direction. In this case, the scroll means shifting of the selectable item among the plurality of items when the button input unit 120 is pressed. An item of the plurality of items displayed on the first display unit 150 is marked as an item to be selected when the button input unit 120 is pressed, and the mark shifts among the plurality of items at the time of scrolling.

In some cases, the wheel input unit 110 may be an input unit which outputs the scroll order as the input unit is pressed in up/down, left/right direction, like a joystick. If the wheel input unit 110 is pressed in the left/right direction, the plurality of items displayed on the first display unit 150 in the horizontal direction may scroll in the horizontal direction, and if pressed in the up/down direction, the plurality of items displayed on the first display unit 150 in the up/down direction may scroll in the up/down direction.

If the plurality of items are not displayed on the first display unit 150 entirely, when scrolled, the plurality of items may be shifted to display items not displayed yet, but not to display the items having displayed, already. This will be described later in detail, with reference to FIG. 4.

In one implementation, if the user rotates the wheel input unit 110 in the clockwise direction, the wheel input unit 110 outputs a right side scroll order for the control unit 130 to scroll the plurality of items displayed on the first display unit 150 to the right side, and, if the user rotates the wheel input unit 110 in the anti-clockwise direction, the wheel input unit 110 outputs a left side scroll order for the control unit 130 to scroll the plurality of items displayed on the first display unit 150 to the left side.

The first display unit 150 is provided to one side of the wheel input unit 110, and the third display unit 170 is provided to the other side of the wheel input unit 110. The button input unit 120 and the second display unit 160 are provided to an inner side of the wheel input unit 160.

The button input unit 120 is a circular input device for outputting the order when the user presses the same. The button input unit 120 can include a variety of devices, such as a button, a switch, and so on, that the user can press, or can alternatively include a touch input device which is not pressed but can sense a pressing motion. In some cases, the button input unit 120 can include a touch screen, together with the second display unit 160.

If the button input unit 120 is pressed, a selection order is outputted to the control unit 130. When the button input unit 120 outputs the selection order, the control unit 130 selects an item from the plurality of items displayed on the first display unit 150. The button input unit 120 is provided on an inside of the wheel input unit 110. The button input unit 120 is coupled with the second display unit 160 such that the second display unit 160 is provided over the button input unit 120. That is, if the second display unit 160 is pressed, the button input unit 120 is pressed. The first display unit 150 is provided on one side of the second display unit 160, and the third display unit 170 is provided to the other side of the second display unit 160.

In some cases, the button input unit 120 may be formed as one unit with the wheel input unit 110 such that the wheel input unit 110 serves as the button input unit 120. If entire or a periphery of the wheel input unit 110 is pressed, the selection order may be outputted to the control unit 130 for the control unit 130 to select an item from the plurality of items displayed on the first display unit 150. And, if the wheel input unit 110 is pressed in an upper side, lower side, left side, or right side direction, the selection order is outputted to the control unit 130 for the control unit 130 to select an item from the plurality of items displayed on the first display unit 150.

In some cases, the button input unit 120 may be formed as one unit with the wheel input unit 110 such that the button input unit 120 serves as the wheel input unit 110. If the button input unit 120 is pressed at a center thereof, the selection order may be outputted, and if the button input unit 120 is pressed at the upper side or the lower side, or the left side or right side, the scroll order may be outputted. If the button input unit 120 is pressed at the left side or right side, the plurality of items displayed on the first display unit 150 in the horizontal direction may scroll in the left side direction or the right side direction, and if the button input unit 120 is pressed at the upper side or the lower side, the plurality of items displayed on the first display unit 150 in the up/down direction may scroll in the upper side direction or the lower side direction.

In some cases, if the button input unit 120 is embodied of a touch screen together with the second display unit 160, and the wheel input unit 110 is embodied of a touch input device which can sense rotation, the wheel input unit 110, the button input unit 120, and the second display unit 160 may be formed as one unit.

The wheel input unit 110 and the button input unit 120 may be embodied as an input unit 110, 120 regardless of a physical structure, to output the scroll order or the selection order depending on user's operation.

The circular second display unit 160 formed on the button input unit 120 displays different pieces of information. The second display unit 160 may be embodied in a variety of modes, such as LCD, LED, OLED, and so on.

In one implementation, the second display unit 160 displays the item selected by the button input unit 120. The item to be displayed on the second display unit 160 may be displayed in modes of letters, icons, or a combination of those. The control unit 130 receives the selection order from the button input unit 120, and the selected item is displayed on the second display unit 160.

When the first display unit 150 displays a plurality of a lower set of items that are associated with the selected item, and the button input unit 120 selects a lower item from the plurality of the lower set of items, the second display unit 160 may display the selected lower item.

The first display unit 150 is provided to one side of the second display unit 160, and the third display unit 170 is provided on the other side of the second display unit 160.

The third display unit 170 is disposed side by side with first display unit 150 with the wheel input unit 110 disposed therebetween. The third display unit 170 may be formed smaller than the first display unit 150, but has an appearance that the third display unit 170 is one unit with the first display unit 150. The third display unit 170 may be embodied in a variety of modes of LCD, LED, OLED, and so on.

In one implementation, when the second display unit 160 has the lower item selected by the button input unit 120 displayed thereon, the third display unit 170 may have the item which was displayed on the second display unit 160 displayed thereon. When the plurality of the lower set of items are displayed on the first display unit 150, and an upper item of the plurality of the lower set of items displayed on the first display unit 150 is displayed on the second display unit 160, the control unit 130, upon reception of the selection order from the button input unit 120, displays the selected lower item on the second display unit 160, and displays the upper item which was displayed on the second display unit 160 on the third display unit 170. The item to be displayed on the third display unit 170 may be letters, icons, or a combination of those.

The control unit 130 receives an order from the wheel input unit 110 or the button input unit 120, and loads data from the storage unit 140 thereon, and produces frames to be displayed on the first display unit 150, the second display unit 160, and the third display unit 170, respectively. The control unit 130 may be embodied of a processor, such as single chip, multiple chips, ASIC (Application Specific Integrated Circuit) and so on.

The control unit 130 receives the scroll order from the wheel input unit 110 and the selection order from the button input unit 120. Upon reception of the scroll order from the wheel input unit 110, the control unit 130 scrolls the plurality of items displayed on the first display unit 150. Upon reception of the selection order from the button input unit 120, the control unit 130 selects an item from the plurality of items displayed on the first display unit 150, and displays the selected item on the second display unit 160, and the plurality of the lower set of items of the selected item on the first display unit 150. When the plurality of the lower set of items are displayed on the first display unit 150 and the upper item of the plurality of the lower set of items displayed on the first display unit 150 is displayed on the second display unit 160, the control unit 130, upon reception of the selection order from the button input unit 120, selects a lower item from the plurality of the lower set of items displayed on the first display unit 150, displays the selected lower item on the second display unit 160, the upper item which was displayed on the second display unit 160 on the third display unit 170, and a plurality of a lower set of items of the selected lower item on the first display unit 150.

The control unit 130 retrieves a list of the plurality of selectable items from the storage unit 140 and displays the same on the first display unit 150. The control unit 130 may retrieve a plurality of a lower set of items of an item of the plurality of items from the storage unit 140, or a plurality of a lower set of items of the plurality of the lower set of items and display the same on the first display unit 150. Besides the plurality of selectable items, the control unit 130 may retrieve other items or information from the storage unit 140 and display the same on the first display unit 150.

The storage unit 140 stores the plurality of selectable items and other different pieces of information therein. The storage unit 140 may be embodied of a memory or a storage, such as RAM (Random Access Memory), ROM (Read Only Memory), EPROM (Erasable Programmable Read Only Memory) and a hard disc. The storage unit 140 may store the plurality of the lower set of items of the plurality of selectable items therein. Since the plurality of selectable items have hierarchical structures, each of the items may have a plurality of the lower set of items, and, in turn, each of the lower set of items may have the plurality of the lower set of items. The plurality of the lower set of items of each of the items may be items different from one another or common items. The storage unit 140 has the plurality of items and hierarchical structures thereof stored therein, and upon retrieval from the control unit 130, the storage unit transmits the plurality of items in a relevant hierarchy to the control unit 130.

Figure 5:
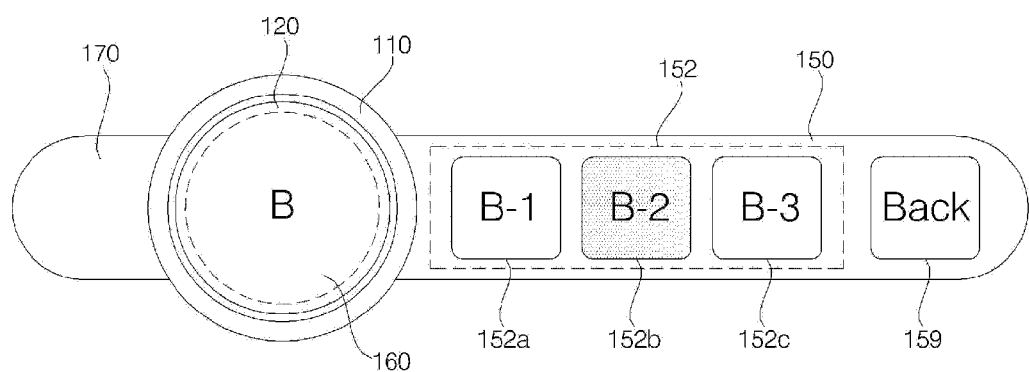
Figure 6:
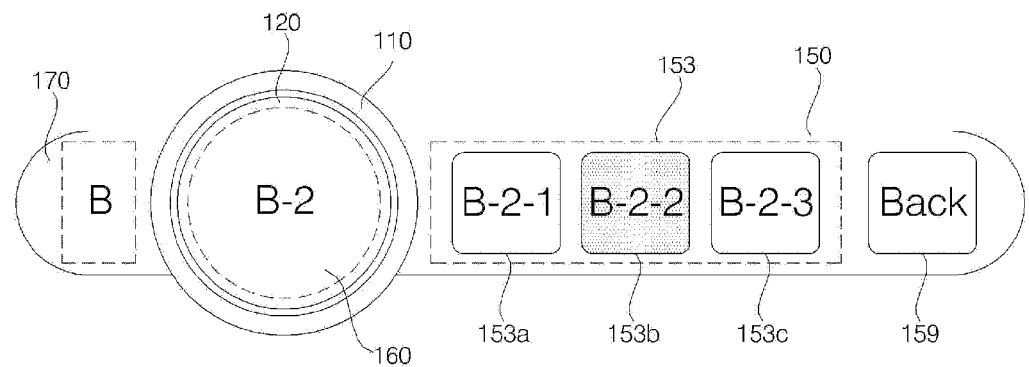
Figure 7:
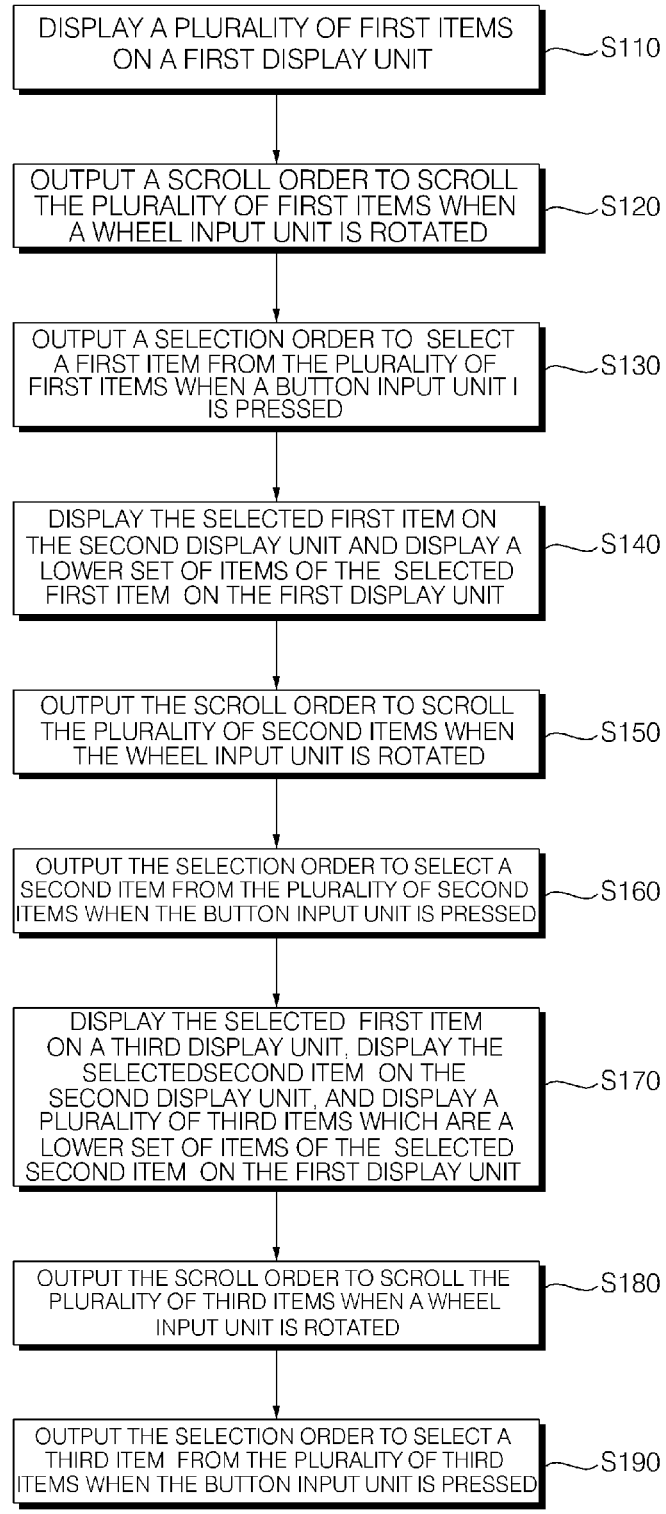
FIG. 7 is a flow chart illustrating the steps of a method for controlling the user interface apparatus.

FIGS. 3 to 6 are plan views each illustrating operation of the user interface apparatus, and FIG. 7 is a flow chart illustrating the steps of a method for controlling the user interface apparatus.

Referring to FIG. 7, a plurality of first items 151 are displayed on the first display unit 150 (S110). Upon putting a user interface apparatus into operation, the control unit 130 retrieves the plurality of selectable first items 151 from the storage unit 140 and displays the same on the first display unit 150. The plurality of first items 151 are uppermost items of the selectable items.

Referring to FIGS. 3 and 4, as illustrated, the plurality of selectable first items 151 include an A item 151a, a B item 151b, a C item 151c, a D item 151d, and an E item 151e, and may include a few more items. The plurality of first items 151 are displayed on the first display unit 150 in a horizontal direction.

The plurality of first items 151 may be displayed on the first display unit 150 starting from a left side to a right side according to a predetermined order. In some cases, the control unit 130 may store user's frequencies of use on the plurality of first items 151 in the storage unit 140 for displaying the plurality of first items 151 on the first display unit 150 according to high orders of the user's frequencies of use starting from the left side to the right side.

Referring to FIG. 3, a first item of the plurality of first items 151 displayed on the first display unit 150 is marked as an item to be selected when the button input unit 120 is pressed. The first item 151 to be selected when the button input unit 120 is pressed is distinguished from other items by size, color or shape, or marked with a pointer, such as a rim and a shadow. FIG. 3 illustrates a case when the B item 151b of the plurality of first items 151 is marked as the item to be selected when the button input unit 120 is pressed. In some cases, the control unit 130 may store the user's frequencies of use on the plurality of first items 151 in the storage unit 140 for displaying a first item of the plurality of first items 151 having a highest frequency of use at first as the item to be selected when the button input unit 120 is pressed at the time the plurality of first items 151 are displayed on the first display unit 150.

If the wheel input unit 110 is rotated, the scroll order is outputted to scroll the plurality of first items (S120). If the user rotates the wheel input unit 110, the wheel input unit 110 outputs the scroll order to the control unit 130. Upon reception of the scroll order, the control unit 130 scrolls the plurality of first items 151 displayed on the first display unit 150 to the left or right side.

If the user rotates the wheel input unit 110 in a clockwise direction, the wheel input unit 110 outputs a right side scroll order such that the control unit 130 scrolls the plurality of first items 151 displayed on the first display unit 150 to the right side, and if the user rotates the wheel input unit 110 in an anti-clockwise direction, the wheel input unit 110 outputs a left side scroll order such that the control unit 130 scrolls the plurality of first items 151 displayed on the first display unit 150 to the left side.

Referring to FIG. 3, of the plurality of first items 151, in a case the B item 151b is marked as the item to be selected when the button input unit 120 is pressed, if the user rotates the wheel input unit 110 in the clockwise direction, the mark scrolls to the right side to mark the C item 151c as the item to be selected when button input unit 120 is pressed, and if the user rotates the wheel input unit 110 in the anti-clockwise direction, the mark scrolls to the left side to mark the A item 151a as the item to be selected when button input unit 120 is pressed.

Referring to FIG. 4, in a case the D item 151d is marked as the item to be selected from the plurality of first items 151 when the button input unit 120 is pressed, if the user rotates the wheel input unit 110 in the clockwise direction, the mark scrolls to the right side such that the plurality of first items 151 displayed on the first display unit 150 move to make an E item 151e which was not displayed to appear and to be displayed on the right side of the first display unit 150, while the A item disappears to the left side of the first display unit 150 so as not to be displayed. Moreover, the E item is marked as the item to be selected when button input unit 120 is pressed.

When the button input unit 120 is pressed, the selection order is outputted to select a first item from the plurality of first items 151 (S130). If the user presses the button input unit 120, the button input unit 120 outputs the selection order to the control unit 130. Upon reception of the selection order, the control unit 130 selects the first item from the plurality of first items 151 displayed on the first display unit 150. The item to be selected when the button input unit 120 is pressed is the first item of the plurality of first items 151 displayed on the first display unit 150 marked as the item to be selected when the button input unit 120 is pressed.

In a case the B item 151b is marked as the item to be selected from the plurality of first items 151 if the button input unit 120 is pressed as shown in FIG. 3, the control unit 130 selects the B item 151b if the user presses the button input unit 120.

The selected first item 151 is displayed on the second display unit 160, and a plurality of second items 152 which are the lower set of items of the selected first item are displayed on the first display unit 150 (S140). The control unit 130 selects the first item from the plurality of first items 151 and displays the selected first item on the second display unit 160. And, the control unit 130 retrieves the plurality of second items 152 which are the lower set of items of the selected first item 151 from the storage unit 140 and displays the plurality of second items 152 on the first display unit 150. The plurality of second items 152 displayed on the first display unit 150 are items the user can select. The plurality of second items 152, being the lower set of items of the plurality of first items 151, are the lower set of items which can be selected, and belong to the selected first item 151, and selected from the lower items of the plurality of first items 151. In some cases, the control unit 130 may display other items or information, together with the plurality of second items 152 on the first display unit 150.

In a case the B item 151b is selected from the plurality of first items 151 as shown in FIG. 3, the B item 151b is displayed on the second display unit 160, and the plurality of second items 152 which are the lower items of the B item 151b are displayed on the first display unit 150 as shown in FIG. 5. In one implementation, a plurality of selectable second items 152 include a B-1 item 152a, a B-2 item 152b, and a B-3 item 152c, and may include a few more items. The plurality of second items 152 are displayed on the first display unit in the horizontal direction.

The plurality of second items 152 may be displayed on the first display unit 150 starting from a left side to a right side according to a predetermined order. In some cases, the control unit 130 may have user's frequencies of use on the plurality of second items 152 stored in the storage unit 140 for displaying the plurality of second items 152 on the first display unit 150 according to high orders of the user's frequencies of use starting from the left side to the right side.

Referring to FIG. 5, a second item of the plurality of second items 152 displayed on the first display unit 150 is marked as the item to be selected when button input unit 120 is pressed. The second item 152 to be selected when the button input unit 120 is pressed may be distinguished from other items by size, color or shape, or marked with a pointer, such as a rim, and a shadow. FIG. 5 illustrates a case when the B-2 item 152b of the plurality of second items 152 is marked as the item to be selected when the button input unit 120 is pressed. In some cases, the control unit 130 may have the user's frequencies of use on the plurality of second items 152 stored in the storage unit 140 for marking a second item of the plurality of second items 152 having a highest frequency of use as the item to be selected when the button input unit 120 is pressed at the time the plurality of second items 152 are displayed on the first display unit 150.

Referring to FIG. 5, a "back" item 159 may be displayed on the first display unit 150 for going back to a frame at which the user may select upper items of the plurality of second items 152 displayed on the first display unit 150. In one implementation, the "back" item 159 may be displayed on the first display unit 150 for going back to selection of the plurality of first items 151. The "back" item 159 may be selected if the user rotates the wheel input unit 110 in the clockwise direction when an item displayed at a rightmost side of the plurality of second items 152 is marked as the item to be selected.

When the back item 159 is marked on the first display unit 150 as the item to be selected when the button input unit 120 is pressed, if the button input unit 120 is pressed, the selection order is received at the control unit 130 to select the back item 159. If the back item 159 is selected, the control unit 130 displays the plurality of first items 151 on the first display unit 150, while not displaying the first item 151 which was displayed on the second display unit 160. If the back item 159 is selected, as shown in FIG. 3, the control unit 130 returns the first display unit 150 and the second display unit 160 to a state before the first item of the plurality of first items 151 is selected.

If the wheel input unit 110 is rotated, the scroll order is outputted, to scroll the plurality of second items 152 (S150). If the user rotates the wheel input unit 110, the wheel input unit 110 outputs the scroll order to the control unit 130. Upon reception of the scroll order, the control unit 130 scrolls the plurality of second items 152 displayed on the first display unit to the left or right side.

If the user rotates the wheel input unit 110 in the clockwise direction, the wheel input unit 110 outputs the right side scroll order such that the control unit 130 scrolls the plurality of second items 152 displayed on the first display unit 150 to the right side, and if the user rotates the wheel input unit 110 in the anti-clockwise direction, the wheel input unit 110 outputs the left side scroll order such that the control unit 130 scrolls the plurality of second items 152 displayed on the first display unit 150 to the left side.

Referring to FIG. 5, in a case the B-2 item 151b is marked as the item to be selected from the plurality of second items 152 when the button input unit 120 is pressed, if the user rotates the wheel input unit 110 in the clockwise direction, the mark scrolls to the right side to mark the B-3 item 152c as the item to be selected when button input unit 120 is pressed, and if the user rotates the wheel input unit 110 in the anti-clockwise direction, the mark scrolls to the left side to mark the B-1 item 152a as the item to be selected when button input unit 120 is pressed.

In a case the B-3 item 152c is marked as the item to be selected from the plurality of second items 152, if the button input unit 120 is pressed, if the user rotates the wheel input unit 110 in the clockwise direction, the mark scrolls to the right side to mark the back item 159 as the item to be selected.

In a case a B-4 (not shown) item is included to the plurality of second items 152 in continuation to the B-3 item 152c, if the user rotates the wheel input unit 110 in the clockwise direction, the plurality of second items 152 displayed on the first display unit 150 are moved to make the B-4 item which has not been displayed to appear and to be displayed on the right side of the first display unit 150, while the B-1 item 152a disappears to the left side of the first display unit 150 so as not to be displayed thereon. Moreover, the B-4 item is marked as the item to be selected if the button input unit 120 is pressed.

If the button input unit 120 is pressed, the selection order is outputted, to select a second item from the plurality of second items 152 (S160). If the user presses the button input unit 120, the button input unit 120 outputs the selection order to the control unit 130. Upon reception of the selection order, the control unit 130 selects the second item from the plurality of second items 152 displayed on the first display unit 150. The item to be selected when the button input unit 120 is pressed is the second item of plurality of second items 152 displayed on the first display unit 150 marked as the item to be selected when the button input unit 120 is pressed.

In a case the B-2 item 152b is marked as the item to be selected from the plurality of second items 152 if the button input unit 120 is pressed as shown in FIG. 5, if the user presses the button input unit 120, the control unit 130 selects the B-2 item 152b.

The first item 151 which is selected already and the upper item of the selected second item is displayed on third display unit 170, the selected second item 152 is displayed on the second display unit 160, and a plurality of third items 153 which are the lower set of items of the selected second item are displayed on the first display unit 150 (S170).

The control unit 130 selects the second item from the plurality of second items 152 and displays the same on the second display unit 160, and displays the first item 151 which was displayed on the second display unit 160 on the third display unit 170. And, the control unit 130 retrieves the plurality of third items 153 which are the lower set of items of the selected second item 152 from the storage unit 140 and displays the plurality of third items 153 on the first display unit 150. The plurality of third items 153 displayed on the first display unit 150 are items the user can select. The plurality of third items 153, being the lower set of items of the plurality of second items 152, are the lower set of items which can be selected, belong to the selected second item 152, and selected from the lower items of the plurality of second items 152. In some cases, the control unit 130 may display other items or information, together with the plurality of third items 153 on the first display unit 150.

In a case the B-2 item 152b is selected from the plurality of second items 152 as shown in FIG. 5, as shown in FIG. 6, the B item 151b is displayed on the third display unit 170, the B-2 item 152b is displayed on the second display unit 160, and the plurality of third items 153 which are the lower set of items of the B-2 item 152b are displayed on the first display unit 150. In one implementation, a plurality of selectable third items 153 include a B-2-1 item 153a, a B-2-2 item 153b, and a B-2-3 item 153c, and may include a few more items. The first display unit has the plurality of third items 153 displayed in the horizontal direction.

The plurality of third items 153 may be displayed on the first display unit 150 starting from a left side to a right side according to a predetermined order. Depending on cases, the control unit 130 may have user's frequencies of use on the plurality of third items 153 stored in the storage unit 140 for displaying the plurality of third items 153 on the first display unit 150 according to high orders of the user's frequencies of use starting from the left side to the right side.

Referring to FIG. 6, a third item of the plurality of third items 153 displayed on the first display unit 150 is marked as the item to be selected when the button input unit 120 is pressed. The third item 153 to be selected when the button input unit 120 is pressed may be distinguished from other items by size, color or shape, or marked with a pointer, such as a rim and a shadow. FIG. 6 illustrates a case when the B-2-1 item 152a of the plurality of third items 153 is marked as the item to be selected when the button input unit 120 is pressed. In some cases, the control unit 130 may have the user's frequencies of use on the plurality of third items 153 stored in the storage unit 140 for marking a third item of the plurality of third items 153 having a highest frequency of use as the item to be selected when the button input unit 120 is pressed at the time the plurality of third items 153 are displayed on the first display unit 150.

Referring to FIG. 6, a "back" item 159 may be displayed on the first display unit 150 for going back to a frame at which the user may select an upper item of the plurality of third items 153 displayed on the first display unit 150. In one implementation, the "back" item 159 may be displayed on the first display unit 150 for going back to selection of the plurality of second items 152. The "back" item 159 may be selected if the user rotates the wheel input unit 110 in the clockwise direction when an item displayed at a rightmost side of the plurality of third items 153 is marked as the item to be selected.

When the back item 159 is marked on the first display unit 150 as the item to be selected when the button input unit 120 is pressed, if the button input unit 120 is pressed, the selection order is received at the control unit 130 to select the back item 159. If the back item 159 is selected, the control unit 130 displays the plurality of second items 152 on the first display unit 150, does not display the first item 151 which was displayed on the third display unit 170, and displays the first item 151 on the second display unit 160. If the back item 159 is selected, as shown in FIG. 5, the control unit 130 returns the first display unit 150 and the second display unit 160 to a state before the second item of the plurality of second items 152 is selected.

If the wheel input unit 110 is rotated, the scroll order is outputted, to scroll the plurality of third items 153 (S180).

If the user rotates the wheel input unit 110, the wheel input unit 110 outputs the scroll order to the control unit 130. Upon reception of the scroll order, the control unit 130 scrolls the plurality of third items 153 displayed on the first display unit to the left or right side.

If the user rotates the wheel input unit 110 in the clockwise direction, the wheel input unit 110 outputs the right side scroll order such that the control unit 130 scrolls the plurality of third items 153 displayed on the first display unit 150 to the right side, and if the user rotates the wheel input unit 110 in the anti-clockwise direction, the wheel input unit 110 outputs the left side scroll order such that the control unit 130 scrolls the plurality of third items 153 displayed on the first display unit 150 to the left side.

Referring to FIG. 6, in a case the B-2-2 item 153b is marked as the item to be selected from the plurality of third items 153 when the button input unit 120 is pressed, if the user rotates the wheel input unit 110 in the clockwise direction, the mark scrolls to the right side to mark the B-2-3 item 153c as the item to be selected when button input unit 120 is pressed, and if the user rotates the wheel input unit 110 in the anti-clockwise direction, the mark scrolls to the left side to mark the B-2-1 item 153a as the item to be selected when button input unit 120 is pressed.

In a case the B-2-3 item 153c is marked as the item to be selected from the plurality of third items 153 if the button input unit 120 is pressed, if the user rotates the wheel input unit 110 in the clockwise direction, the mark scrolls to the right side to mark the back item 159 as the item to be selected.

In a case a B-2-4 (not shown) item is included to the plurality of third items 153 in continuation to the B-2-3 item 153c, if the user rotates the wheel input unit 110 in the clockwise direction, the plurality of third items 153 displayed on the first display unit 150 are moved to make the B-2-4 item which has not been displayed to appear and to be displayed on the right side of the first display unit 150, while the B-2-1 item 153a disappears to the left side of the first display unit 150 so as not to be displayed thereon. Moreover, the B-2-4 item is marked as the item to be selected if the button input unit 120 is pressed.

If the button input unit 120 is pressed, the selection order is outputted, to select the third item from the plurality of third items 153 (S190). If the user presses the button input unit 120, the button input unit 120 outputs the selection order to the control unit 130. Upon reception of the selection order, the control unit 130 selects the third item from the plurality of third items 153 displayed on the first display unit 150. The item to be selected when the button input unit 120 is pressed is the third item of plurality of third items 153 displayed on the first display unit 150 marked as the item to be selected when the button input unit 120 is pressed.

In a case the B-2-2 item 153*b* of the plurality of third items 153 is marked as the item to be selected If the button input unit 120 is pressed as shown in FIG. 6, if the user presses the button input unit 120, the control unit 130 selects the B-2-2 item 153*b*.

In a case a plurality of selectable fourth items, which are the lower set of items of the selected third item 153 exist, the plurality of fourth items are displayed on the first display unit 150, the selected third item is displayed on the second display unit 160, and the second item 152 which is the upper item of the third item and selected already is displayed on the third display unit 170. If a plurality of selectable items of the selected item exist continuously, the steps of S170 to S190 are progressed, repeatedly.

Figure 8:
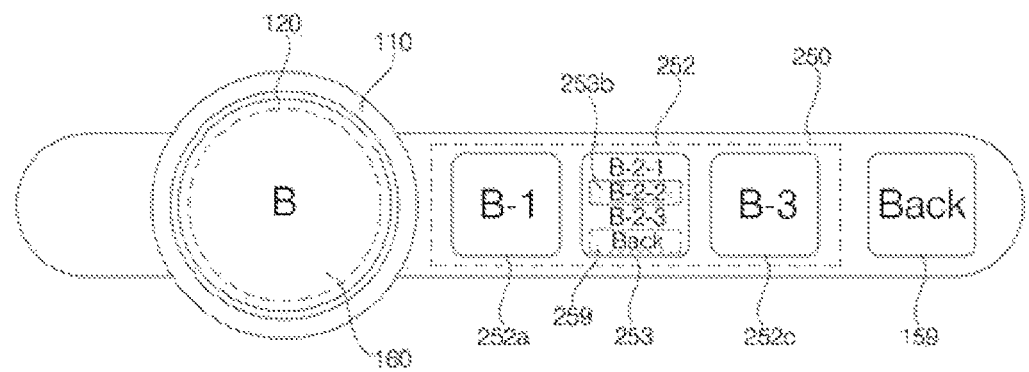
FIG. 8 is a plan view illustrating operation of an alternative implementation of the user interface apparatus.

FIG. 8 is a plan view illustrating operation of the user interface apparatus in accordance with another implementation of the present application.

For example, if a button input unit 120 is pressed to output a selection order, to select a second item from a plurality of second items 252, a first item (B) which is selected already and an upper item of the selected second item is displayed on a second display unit 160, and a plurality of third items 253 which are the lower set of items of the selected second item are displayed on the first display unit 250 together with the plurality of second items 252 which are not selected. In this implementation, a third display unit may not be needed.

The control unit 130 retrieves the plurality of third items 253 which are the lower set of items of the selected second item 252 from a storage unit 140, and displays the plurality of third items 253 at a position the selected second item 252 was displayed on the first display unit 250. The first display unit 250 has the plurality of third items 253 displayed thereon together with the plurality of second items 252 which are not selected.

The plurality of third items 253 are displayed on the first display unit 250 in a vertical direction. The plurality of third items 253 may be displayed on the first display unit 250 starting from an upper side to a lower side according to a predetermined order. In some cases, a control unit 130 may have user's frequencies of use on the plurality of third items 153 stored in the storage unit 140 for displaying the plurality of third items 253 on the first display unit 250 according to user's use frequencies in an order of high frequencies of use starting from the upper side to the lower side.

Referring to FIG. 8, a third item of the plurality of third items 253 displayed on the first display unit 150 is marked as the item to be selected when the button input unit 120 is pressed. The third item 253 to be selected when the button input unit 120 is pressed may be distinguished from other items by size, color or shape, or marked with a pointer, such as a rim and a shadow.

FIG. 8 illustrates a case when the B-2-2 item 253*b* of the plurality of third items 253 is marked as the item to be selected when the button input unit 120 is pressed. In some cases, the control unit 130 may have the user's frequencies of use on the plurality of third items 253 stored in the storage unit 140 for marking a third item of the plurality of third items 253 having a highest frequency of use at first as the item to be selected when the button input unit 120 is pressed at the time the plurality of third items 253 are displayed on the first display unit 250.

Upon reception of the scroll order, the control unit 130 scrolls the plurality of third items 253 displayed on the first display unit 250 in up/down directions. If the user rotates the wheel input unit 110 in a clockwise direction, the wheel input unit 110 outputs a down direction scroll order such that the control unit 130 scrolls the plurality of third items 253 displayed on the first display unit 250 in the down direction, and if the user rotates the wheel input unit 110 in an anti-clockwise direction, the wheel input unit 110 outputs an up direction scroll order such that the control unit 130 scrolls the plurality of third items 253 displayed on the first display unit 250 in the up direction.

Referring to FIG. 8, the first display unit 250 may h have a "back" item 259 which enables to select the plurality of second items 252 which are upper items of the plurality of third items 253 displayed thereon together with the plurality of third items 253. The back item 259 may be displayed under a lowest end of the plurality of third items 253. The first display unit 250 may have the back item 159 which enables to select an upper item of the plurality of second items 252, altogether.

Figure 9:
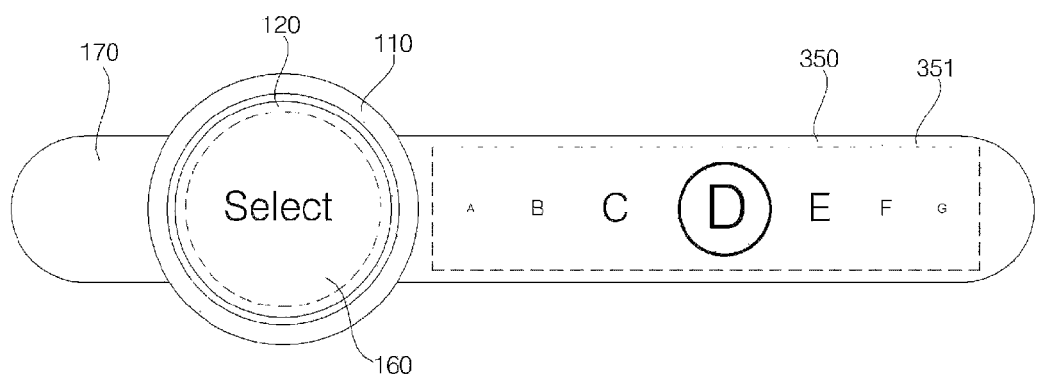
FIG. 9 is a plan view illustrating operation of another alternative implementation of the user interface apparatus.

FIG. 9 is a plan view illustrating operation of the user interface apparatus in accordance with yet another implementation of the present application.

Referring to FIG. 9, in the user interface apparatus, a plurality of first items 351 are displayed on a first display unit 350 in different sizes in a horizontal direction, with an item to be selected when the button input unit 120 is pressed displayed in a largest size at middle thereof.

If the wheel input unit 110 rotated in a clockwise or anti-clockwise direction to output a scroll order, the control unit 130 scrolls the plurality of first items 351 displayed on the first display unit 350 in a left or right direction, entirely. The item to be selected by the button input unit 120 is maintained at the middle of the first display unit 350 at the time the scroll order is received while the plurality of first items 351 are scrolled, entirely. At the time the plurality of first items 351 are scrolled entirely, the item which is to be selected and positioned at the middle is displayed in a largest size, and will be displayed the smaller as the item goes to the left side or the right side the more.

Figure 10:
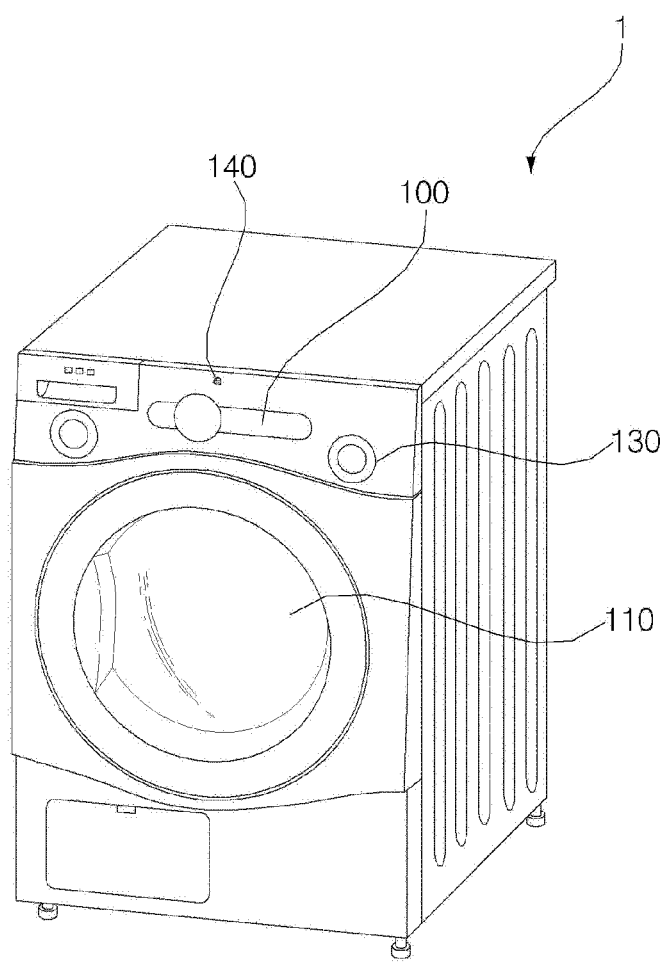
FIG. 10 is a perspective view of a laundry treating apparatus including the user interface apparatus.

FIG. 10 is a perspective view illustrating a laundry treating apparatus including the user interface apparatus.

Referring to FIG. 10, the laundry treating apparatus 1 includes a cabinet 140 which forms an exterior appearance thereof, a drum 110 rotatably arranged in the cabinet 140 for holding laundry, a user interface apparatus 100 arranged on the cabinet 140 for user's input of an order, and displaying information on the order inputted thus, and a start button 130 for putting the laundry treating apparatus 1 into operation.

Figure 11:
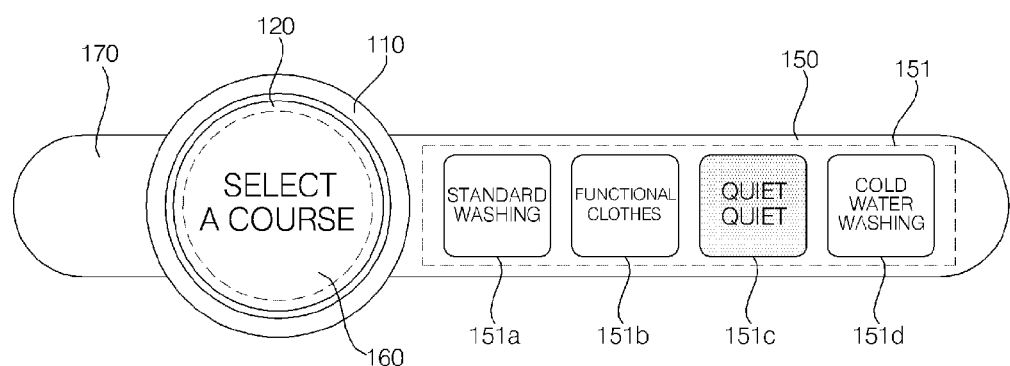
FIGS. 11 to 13 are plan views each illustrating operation of the user interface apparatus in the laundry treating apparatus.
Figure 12:
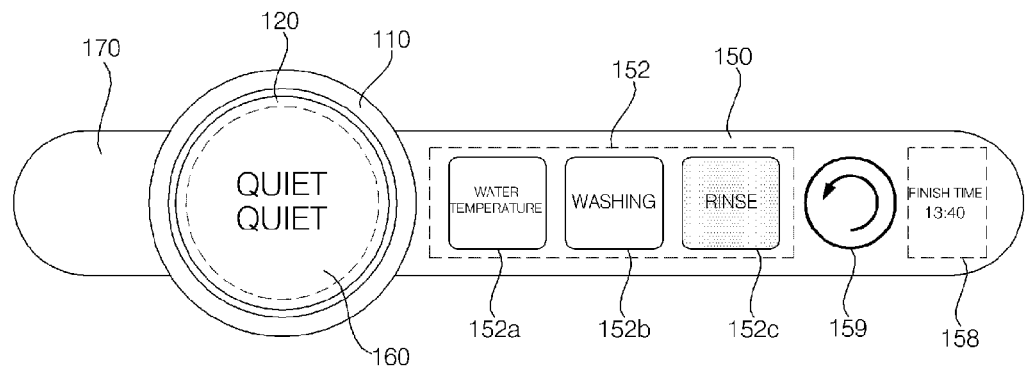
Figure 13:
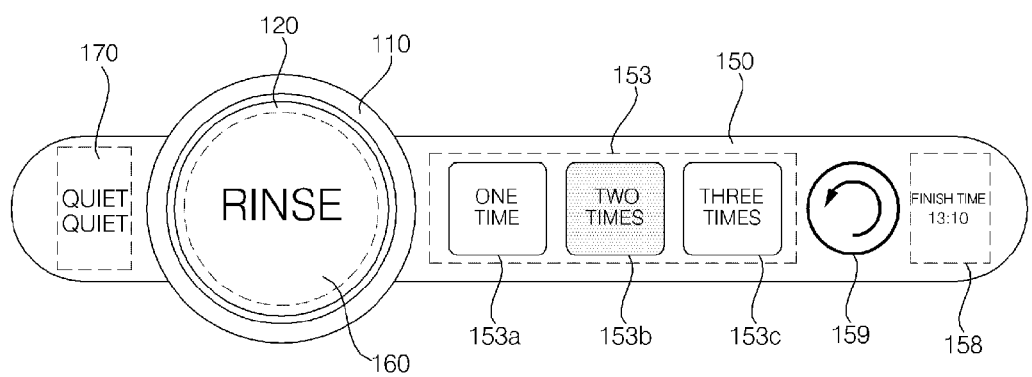

FIGS. 11 to 13 are perspective views each illustrating operation of the user interface apparatus in the laundry treating apparatus.

The laundry treating apparatus 1 displays a plurality of first items 151 on a first display unit 150 in the user interface apparatus 100 if power is applied to the laundry treating apparatus to be ready to treat the laundry. In this implementation, the plurality of first items 151 are washing courses. The washing courses, an uppermost set of the items the user can select from the laundry treating apparatus, set a method, a time period, a number of times of each stroke of laundry treating according to kinds of fabric or function. The plurality of first items 151 which can be the washing courses include courses of standard washing 151*a*, functional clothes 151*b*, quiet 151*c*, cold water washing 151*d*, color care, lingerie/wool, blanket, rinse spinning, steam cleaning, allergy care, speed wash, economy boiling, baby clothes, old set stains, and steam.

A control unit 130 stores user's use frequencies on the plurality of first items 151 in the storage unit 140, for displaying the plurality of first items 151 on the first display unit 150 starting from a left side to a right side according to high order of the user's use frequencies. In one implementation, of the plurality of first items 151, the standard washing 151a is an item used most frequently, and the use frequencies become the lower in an order of the functional clothes 151b, the quiet 151c, the cold water washing 151d, and so on.

In this implementation, the second display unit 160 may have words which help user's use, such as "Select course", as shown in FIG. 11 displayed thereon.

When the user rotates the wheel input unit 110, the wheel input unit 110 outputs a scroll order to the control unit 130, and the control unit 130 scrolls the plurality of first items 151 displayed on the first display unit 150 in a horizontal direction. As shown in FIG. 11, in a case the quiet 151c is selected from the plurality of first items 151 as the item to be selected when the button input unit 120 is pressed, if the user rotates the wheel input unit 110 in a clockwise direction, to scroll the mark to the right side, the cold water washing 151d is marked as the item to be selected when the button input unit 120 is pressed, and, if the user rotates the wheel input unit 110 in an anti-clockwise direction, to scroll the mark to the left side, the functional clothes 151b is marked as the item to be selected when the button input unit 120 is pressed.

In a case the cold water washing 151d is marked as the item to be selected from the plurality of first items 151 when the button input unit 120 is pressed, if the user rotates the wheel input unit 110 in the clockwise direction, the mark is scrolled to the right side to move the plurality of first items 151 displayed on the first display unit 150 to make the color care, which was not displayed to appear and to be displayed on the right side of the first display unit 150, while the standard washing 151a disappears to the left side of the first display unit 150 so as not to be displayed on the first display unit 150. Moreover, the color care is marked as the item to be selected when the button input unit is pressed.

If the user presses the button input unit 120, the button input unit 120 outputs the selection order to the control unit 130 such that the control unit 130 selects a first item from the plurality of first items 151 displayed on the first display unit 150. As shown in FIG. 11, in a case the quiet 151c is selected from the plurality of first items 151 as the item to be selected when the button input unit 120 is pressed, if the user presses the button input unit 120, the control unit 130 selects the quiet 151c.

If a first item 151 is selected from the plurality of first items 151, the selected first item 151 is displayed on the second display unit 160, and the plurality of second items 152 which are a lower set of items of the selected first item is displayed on the first display unit 150.

In a case the quiet 151c is selected from the plurality of first items 151 as shown in FIG. 11, the quiet 151c is displayed on the second display unit 160, and the plurality of second items 152 which are the lower set of items of the quiet 151c are displayed on the first display unit 150 in the horizontal direction. In one implementation, the plurality of selectable second items 152 may further include a water temperature 152a, a washing 152b, and a rinsing 152c, and may further include a few more items.

In this implementation, besides the water temperature 152a, the washing 152b, and the rinsing 152c, the plurality of the second items 152 may include a spinning intensity, a steam, a dry, and a scheduled washing, and the plurality of selectable second items 152 are selected from those items depending on the selected first item 151. For an example, the functional clothes 151b is selected from the plurality of first items 151, the plurality of selectable second items 152 may only be the rinsing 152c and the scheduled washing.

In this implementation, a "back" item 159, which enables to go back to a frame at which an upper item of the plurality of second items 152 displayed on the first display unit 150, and a finish time item 158, which indicates a laundry treating finish time of the selected first item 151, are displayed on the first display unit 150.

When the back item 159 is selected, the plurality of first items 151 are displayed on the first display unit 150 as shown in FIG. 11, while the first item 151 which was displayed on the second display unit 160 is not displayed.

The finish time item 158 is a predicted finish time when the laundry is treated according to the selected first item 151, and may be displayed when the selectable second item 152 of the selected first item 151 and the third item 153 are set as reference values.

If the user rotates the wheel input unit 110, the wheel input unit 110 outputs the scroll order to the control unit 130, and the control unit 130 scrolls the plurality of second items 152 displayed on the first display unit 150 in the left or right direction. In a case the rinse 152c is marked as the item to be selected from of the plurality of second items 152 when the button input unit 120 is pressed as shown in FIG. 12, if the user rotates the wheel input unit 110 in the clockwise direction, the back item 159 is marked as the item to be selected when the button input unit 120 is pressed, and if the user rotates the wheel input unit 110 in the anti-clockwise direction, the mark is scrolled to the left side to mark the washing 152b as the item to be selected when the button input unit 120 is pressed.

If the user presses the button input unit 120, the button input unit 120 outputs the selection order to the control unit 130, such that the control unit 130 selects a second item from the plurality of second items 152 displayed on the first display unit 150.

In a case the rinse 152c is marked as the item to be selected from the plurality of second items 152 when the button input unit 120 is pressed as shown in FIG. 12, if the user presses the button input unit 120, the control unit 130 selects the rinse 152c.

If a second is selected from the plurality of second items 152, the first item 151 which is selected already and an upper item of the selected second item is displayed on the third display unit 170, the selected second item 152 is displayed on the second display unit 160, and the plurality of third items 153 which are the lower set of items of the selected second item are displayed on the first display unit 150.

In a case the rinse 152c is selected from the plurality of second items 152 as shown in FIG. 12, as shown in FIG. 13, the quiet 151c is displayed on the third display unit 170, the rinse 152c is displayed on the second display unit 160, and the plurality of third items 153 which are the lower set of items of the quiet 151c are displayed on the first display unit 150 in the horizontal direction. In one implementation, a plurality of selectable third items 153 may include one time 153a, two times 153b and three times 153c, and may include a few more items.

In this implementation, a back item 159, which enables to go back to a frame at which an upper item of the plurality of third items 153 displayed on the first display unit 150, and a finish time item 158, which indicates the laundry treating finish time of the selected third item 153, are displayed on the first display unit 150.

If the user rotates the wheel input unit 110, the wheel input unit 110 outputs the scroll order to the control unit 130, such that the control unit 130 scrolls the plurality of third items 153 displayed on the first display unit 150 in the left or right direction. As shown in FIG. 13, in a case the two times 153b is marked as the item to be selected from the plurality of third items 153 if the button input unit 120 is pressed, if the user rotates the wheel input unit 110 in the clockwise direction, the mark is scrolled to the right side to mark the three times 153*c* as the item to be selected if the button input unit 120 is pressed, and if the user rotates the wheel input unit 110 in the anti-clockwise direction, the mark is scrolled to the left side to mark the one time 153*a* as the item to be selected if the button input unit 120 is pressed.

The finish time indicated on the finish time item 158 may be changed according to the left or right direction scroll of the plurality of third items 153. Since the laundry treating finish time may be changed according to the item to be selected from the plurality of third items 153, the finish time indicated on the finish time item 158 is changed by reflecting this.

If the user presses the button input unit 120, the button input unit 120 outputs the selection order to the control unit such that the control unit 130 selects a third item from the plurality of third items 153 displayed on the first display unit 150.

In a case the two times 153*b* is marked as the item to be selected from the plurality of third items 153 if the button input unit 120 is pressed, if the user presses the button input unit 120, the control unit 130 selects the two times 153*b*.

With such steps, in this implementation, the user may select the two times 153*b* as a number of times of the rinse 152*c* in the quiet 151*c* course.

If the user presses a start button 130 after finishing all settings with the user interface apparatus 100, the start button 130 outputs the start order to the control unit 130. Upon reception of the start order, the control unit 130 operates the laundry treating apparatus 1 according to a selected course and detailed settings.

Figure 14:
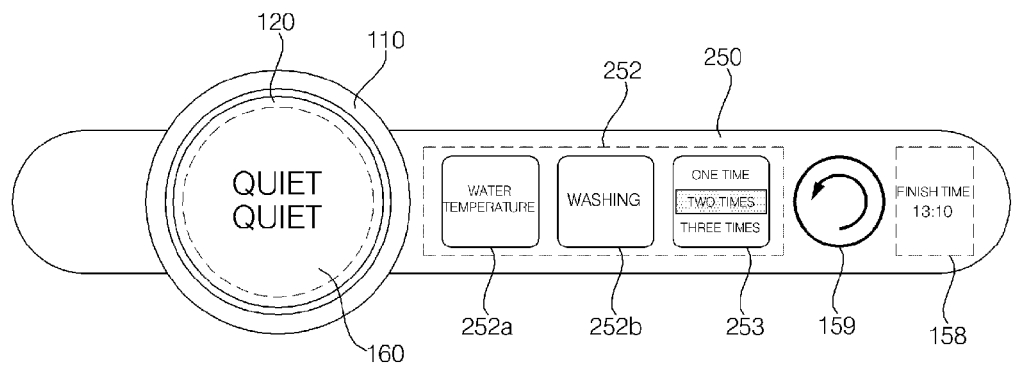
FIG. 14 is a plan view illustrating operation of an alternative implementation of the user interface apparatus in the laundry treating apparatus.

FIG. 14 is a perspective view illustrating operation of a user interface apparatus in a laundry treating apparatus in accordance with another implementation of the present application.

Referring to FIG. 14, in the user interface apparatus, if a second item is selected from a plurality of second items 252, the control unit 130 displays a plurality of third items 253 at a position of the first display unit 250 where the selected second item was displayed. A plurality of second items 252 which were not selected are displayed on the first display unit 250, together with the plurality of third items 253.

The plurality of third items 253 are displayed on the first display unit 250 in a vertical direction. The plurality of third items 253 may be displayed on the first display unit 250 starting from an upper side to a lower side according to a predetermined order. As shown in FIG. 14, the plurality of third items 253 displayed on the first display unit 250 include one time, two times, and third times displayed in the vertical direction.

The first display unit 250 may have the third item 153 to be selected when the button input unit 120 is pressed displayed thereon distinguished from other items by size, color or shape, or marked with a pointer, such as a rim, a shadow and so on. FIG. 14 illustrates a case the "two times" is marked as the item to be selected from the plurality of third items 253 when the button input unit 120 is pressed.

Upon reception of the scroll order, the control unit 130 scrolls the plurality of third items 253 displayed on the first display unit 250 in an up or down direction. As shown in FIG. 13, in a case the "two times" is marked as the item to be selected from the plurality of third items 253 when the button input unit 120 is pressed, if the user rotates the wheel input unit 110 in the clockwise direction to scroll the mark in the down direction, the "three times" is marked as the item to be selected when the button input unit 120 is pressed, and, if the user rotates the wheel input unit 110 in the anti-clockwise direction to scroll the mark in the up direction, the "one time" is marked as the item to be selected when the button input unit 120 is pressed.

The wheel input unit 110 and the button input unit 120 may be, not limited to as physical input units, but embodied of electronic devices or software modules which receive signals from the physical input units to output orders. And, the first display unit 150, the second display unit 160, and the third display unit 170 may be, not limited to as physical display units, but embodied of electronic devices or software modules which receive signals to output display signals.

That is, an aspect of this application may be applied to the wheel input unit 110, the button input unit 120, the first display unit 150, the second display unit 160, and the third display unit 170 which are embodied of electronic devices or software modules.

As has been described, the user interface apparatus and the method for controlling the same of this application can have one or more of the following features.

First, intuitive display of selectable items having a hierarchical structure on limited display means is permitted.

Second, handy selection of items having a hierarchical structure is permitted by simple operation of rotation and pressing.

Third, display of selected items on limited display means is permitted.

It will be apparent to those skilled in the art that this application is not intended to be limited to the above-described implementations and drawings, and various changes or modifications may be made therein without departing from the scope and the technical sprit of this application.

What is claimed is:

1. A user interface apparatus for a laundry treating apparatus, comprising:
   a first display device that is configured to display a plurality of first items;
   a wheel input control that is positioned proximate a first side of the first display device, that is rotatable, and that is configured to, based upon being rotated, output a scroll command to scroll the plurality of first items;
   a button input control that is positioned within a circumference of the wheel input control, wherein the button input control is pressed and a selection command to selects a first item from the plurality of first items; and
   a second display device that is positioned within the circumference of the wheel input control and displays the selected first item,
   wherein, in response to the selection of the first item, display on the first display device, a plurality of second items that are associated with the selected first item, a back item, and a finish time item,
   wherein the first display device displays the back item and the finish time item while displaying the plurality of second items,
   wherein when the back item is selected based upon the button input control being pressed, the first display device returns to display the plurality of first items, and the second display device does not display the selected first item,
   wherein the plurality of first items include washing courses, and the plurality of second items include at least one of a water temperature, a washing, a rinsing, a spinning intensity, a steam, a dry, or a scheduled washing,
wherein the finish time item indicates a laundry treating finish time of the selected first item.

2. The user interface apparatus of claim 1, wherein the wheel input control is configured to, based upon the plurality of second items being displayed on the first display device and the wheel input control being rotated, output a scroll command to scroll the plurality of second items.

3. The user interface apparatus of claim 1, wherein the button input control is configured to, based upon the plurality of second items being displayed on the first display device and the button input control being pressed, output a selection command to select a second item from the plurality of second items.

4. The user interface apparatus of claim 3, wherein the second display device is configured to, based upon reception of the selection command to select the second item, display the selected second item, and wherein the first display device is configured to, based upon reception of the selection command to select the second item, display a plurality of third items associated with the selected second item.

5. The user interface apparatus of claim 4, further comprising a third display device that is positioned on a first side of the wheel input control opposite a second side of the wheel input control, wherein the second side of the wheel input control is proximate the first side of the first display device, the third display device being configured to, based on the selected second item being displayed on the second display device, display the first selected item.

6. The user interface apparatus of claim 5, wherein the first display device is elongated relative to the third display device in the side-to-side direction.

7. The user interface apparatus of claim 6, wherein the third display device is configured to display no more than one selected item at a time.

8. The user interface apparatus of claim 4, wherein the wheel input control is configured to, based upon the plurality of third items being displayed on the first display device and wheel input control being rotated, output the scroll command to scroll the plurality of third items.

9. The user interface apparatus of claim 4, wherein the button input control is configured to, based upon the plurality of third items being displayed on the first.

10. The user interface apparatus of claim 3, wherein the first display device is configured to, based upon reception of the selection command to select the second item, display a plurality of third items associated with the selected second item, together with the plurality of second items that have not been selected.

11. The user interface apparatus of claim 10, wherein the wheel input control is configured to, based upon the plurality of third items being displayed on the first display device and the wheel input control being rotated, output the scroll command to scroll the plurality of third items.

12. The user interface apparatus of claim 10, wherein the button input control is configured to, based upon the plurality of third items being displayed on the first display device and the button input control being pressed, output the selection command to select a third item from the plurality of third items.

13. A method for controlling a user interface for a laundry treating apparatus comprising the steps of:
displaying a plurality of first items on a first display device, wherein the plurality of first items include washing courses:
scrolling the plurality of first items based upon a wheel input control being rotated, that is provided on one side of the first display device;
selecting a first item from the plurality of first items based upon a button input control being pressed, that is provided within a circumference of the wheel input control;
displaying the selected first item on a second display device that is provided within the circumference of the wheel input control,
displaying a plurality of second items that are associated with the selected first item on the first display device, wherein the plurality of second items include at least one of a water temperature, a washing, a rinsing, a spinning intensity, a steam, a dry, or a scheduled washing,
displaying, while displaying the plurality of second items, a back item for going back to selection of the plurality of first items on the first display device and a finish time item for indicating a laundry treating finish time of the selected first item on the first display device;
selecting the back item based upon the button input control being pressed; and
displaying the plurality of first items on the first display device while not displaying the selected first item on the second display device.

14. The method as claimed in claim 13, further comprising the step of scrolling, based upon the wheel input control being rotated and the plurality of second items being displayed on the first display device, the plurality of second items.

15. The method as claimed in claim 13, further comprising the step of selecting, based upon the button input control being pressed and the plurality of second items being displayed on the first display device, a second item from the plurality of second items.

16. The method as claimed in claim 15, further comprising the step of displaying, based upon the second item being selected and the selected second item being displayed on the display device, a plurality of third items associated with the selected second item on the first display device.

17. The method as claimed in claim 15, further comprising the step of displaying on the first display device, based upon the second item being selected, a plurality of third items associated with the selected second item together with the plurality of second items that have not been selected.

* * * * *